C. C. BLAKE.
MACHINE FOR MAKING INSULATED NAILS.
APPLICATION FILED MAY 18, 1918.
1,411,951.
Patented Apr. 4, 1922.
13 SHEETS—SHEET 7.
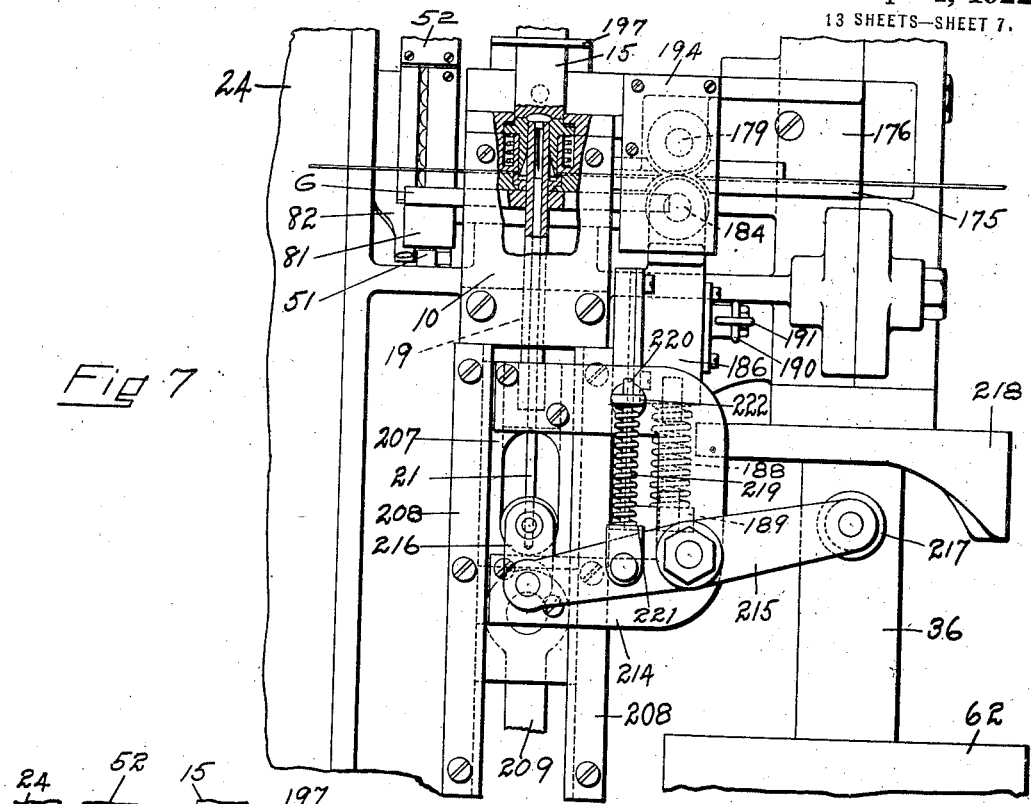
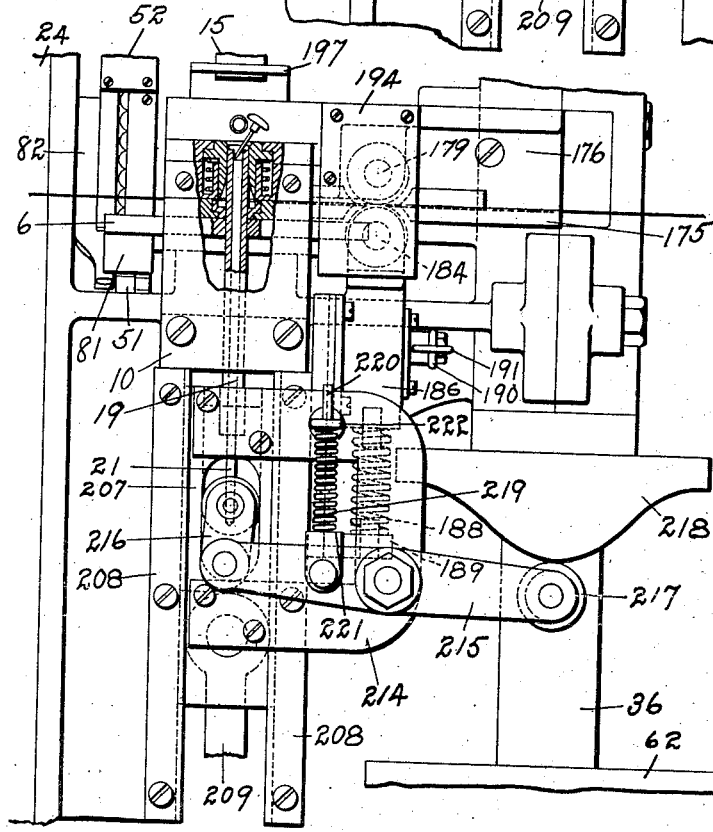
INVENTOR
Charles C. Blake
by Charles W. McDermott
his attorney

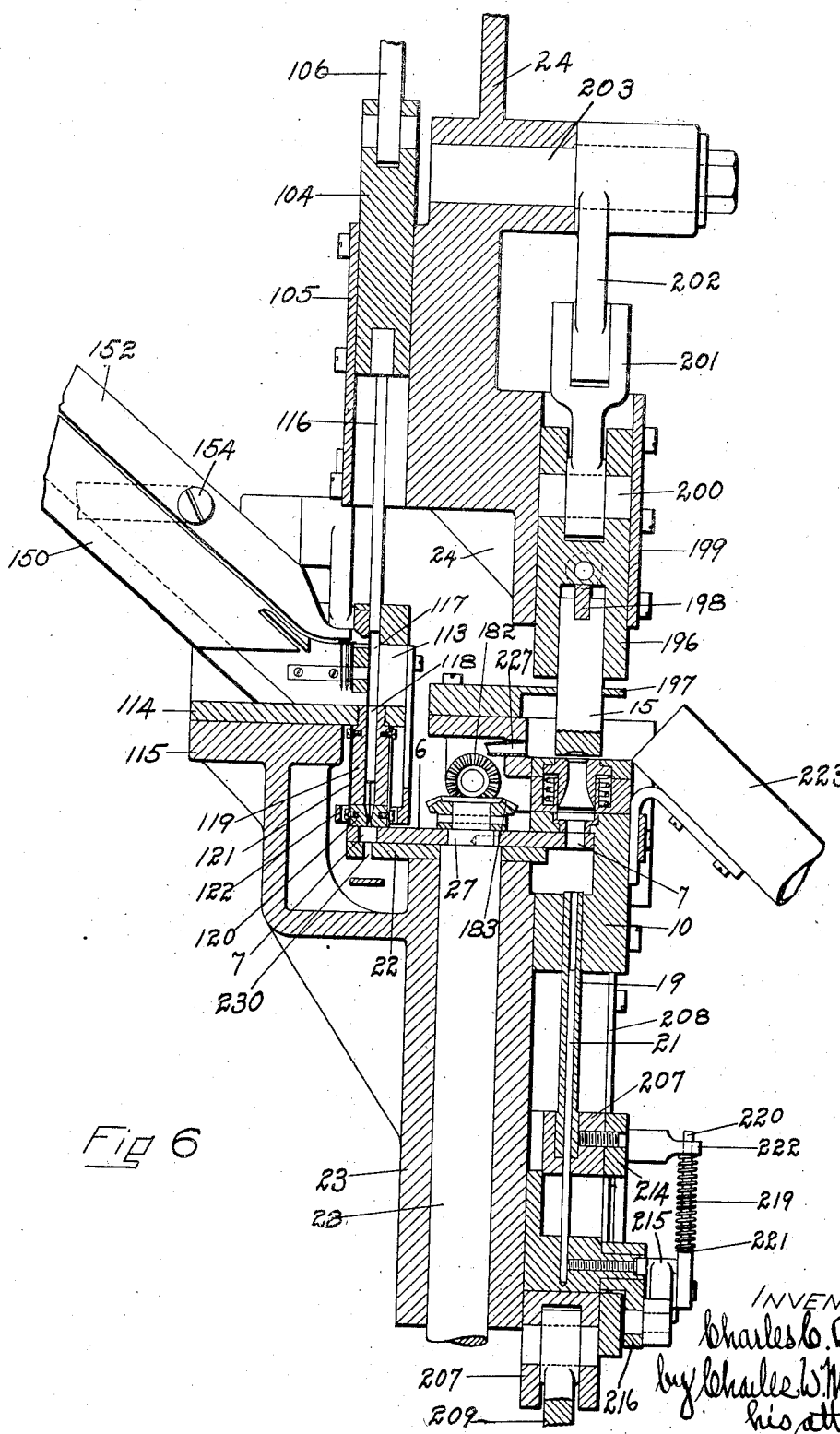

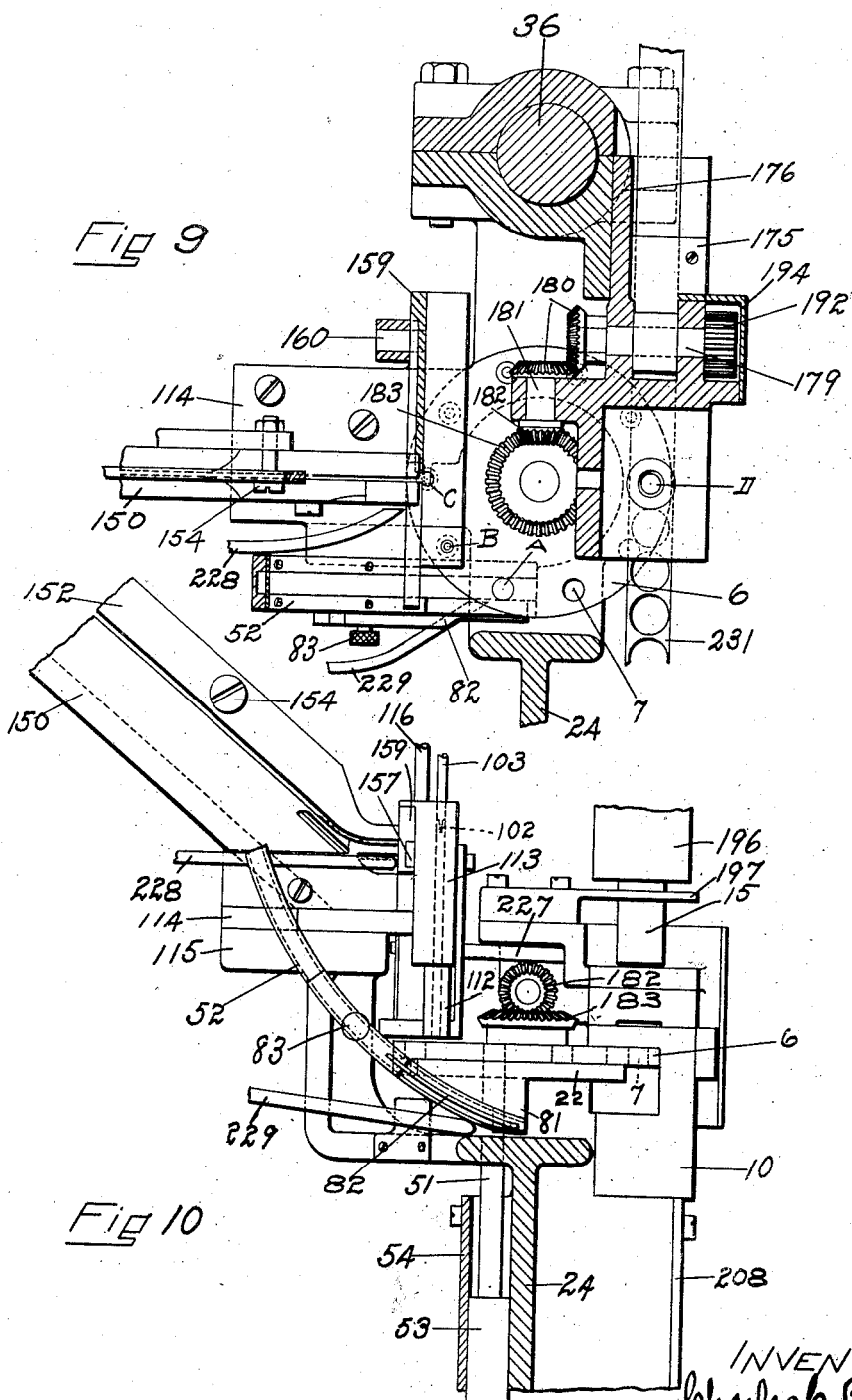

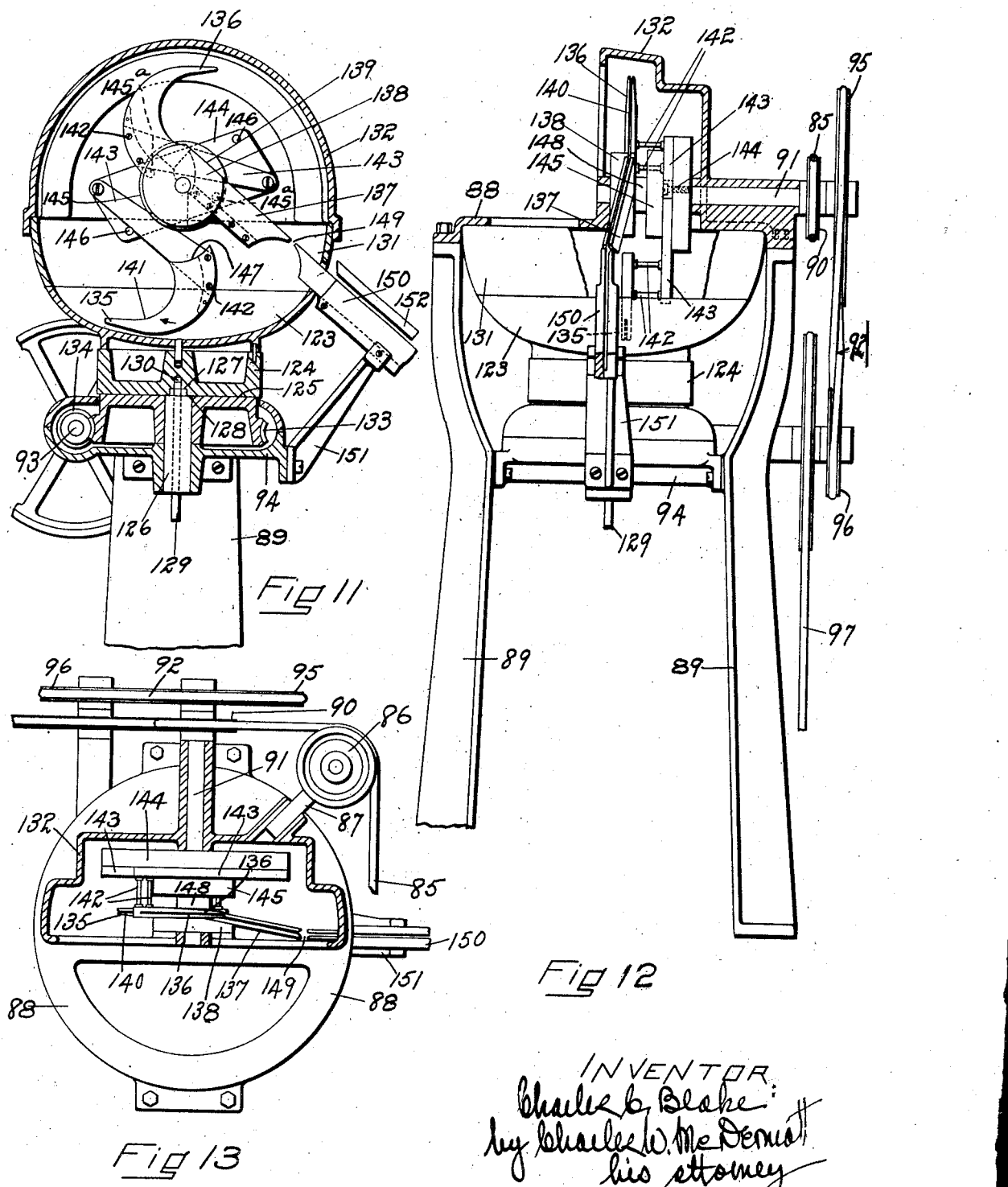

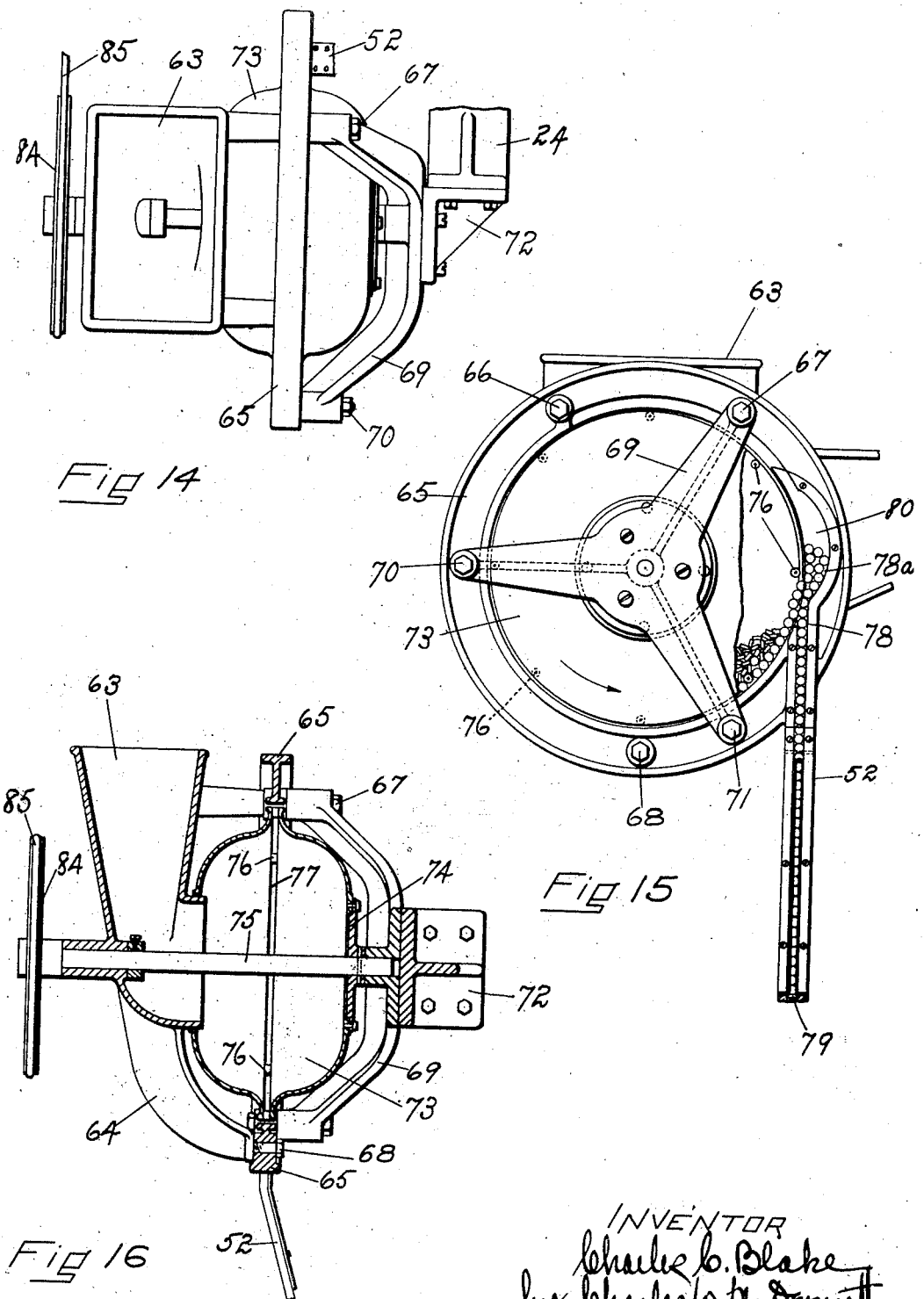

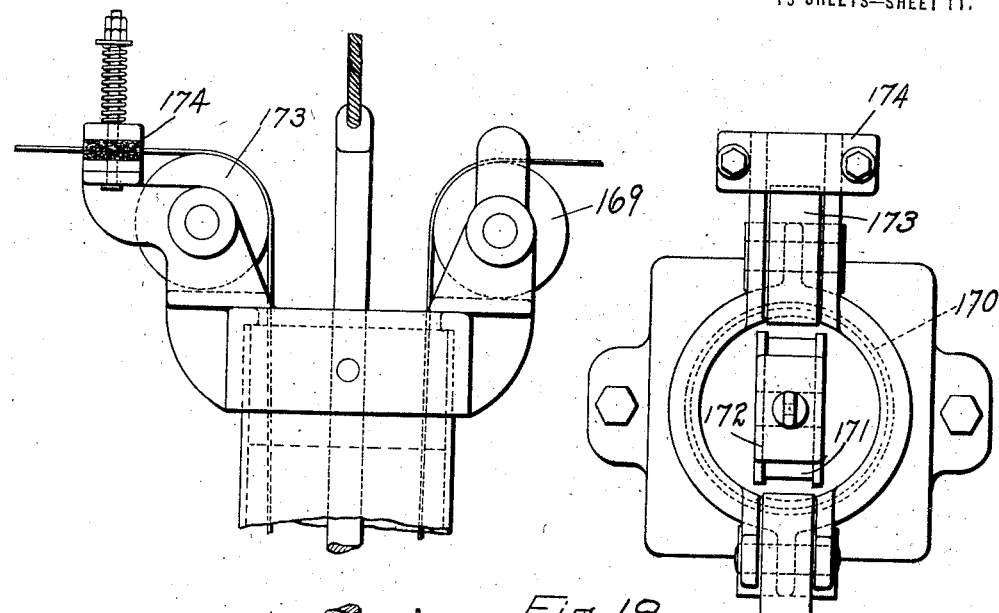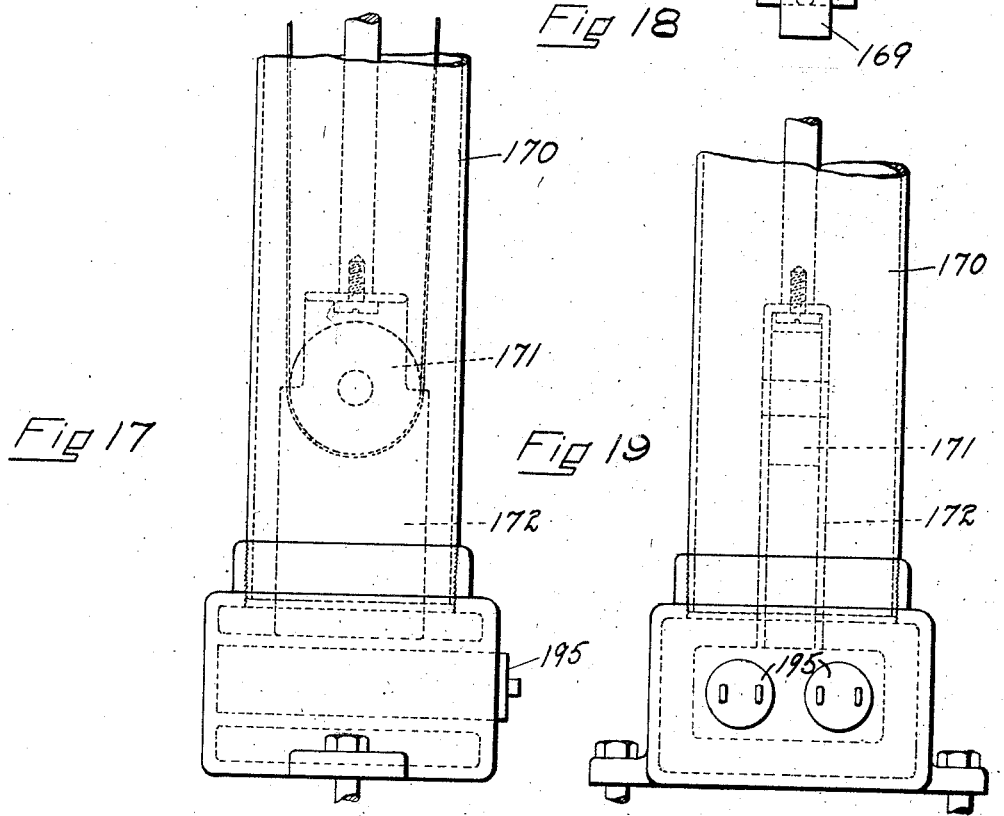

C. C. BLAKE.
MACHINE FOR MAKING INSULATED NAILS.
APPLICATION FILED MAY 18, 1918.
1,411,951.
Patented Apr. 4, 1922.
13 SHEETS—SHEET 13.
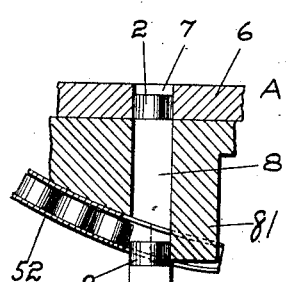
Fig 24
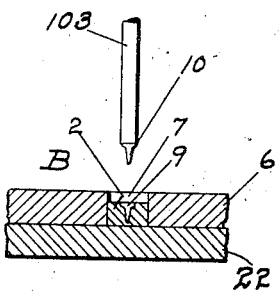
Fig 25
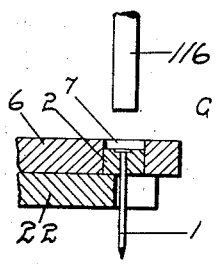
Fig 26
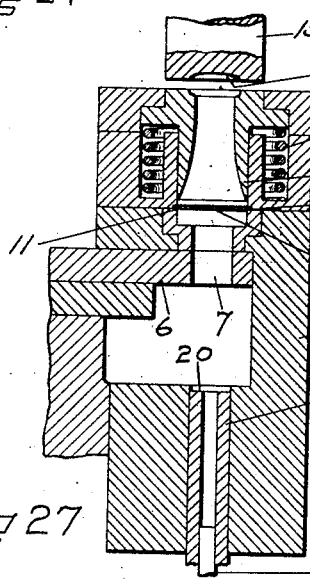
Fig 27
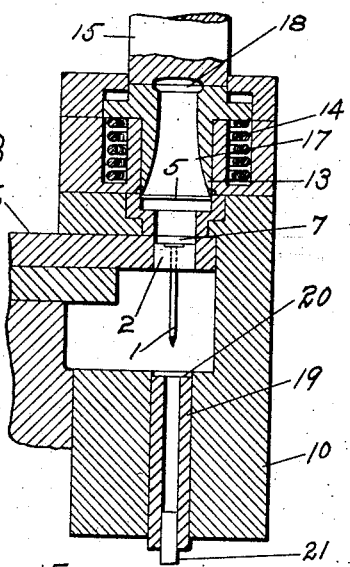
Fig 28
Fig 31
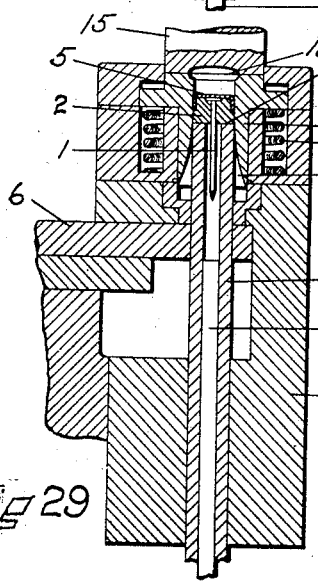
Fig 29
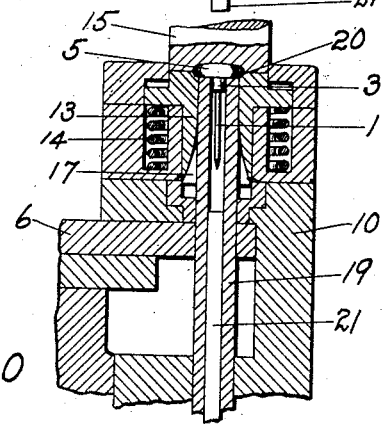
Fig 30
INVENTOR
Charles C. Blake
by Charles W. McDermott
his attorney

UNITED STATES PATENT OFFICE.

CHARLES C. BLAKE, OF BROOKLINE, MASSACHUSETTS.

MACHINE FOR MAKING INSULATED NAILS.

1,411,951.   Specification of Letters Patent.   Patented Apr. 4, 1922.

Application filed May 18, 1918. Serial No. 235,243.

*To all whom it may concern:*

Be it known that I, CHARLES C. BLAKE, a citizen of the United States, residing at Brookline, in the county of Norfolk and State of Massachusetts, have invented certain Improvements in Machines for Making Insulated Nails, of which the following description, in connection with the accompanying drawings, is a specification, like reference characters on the drawings indicating like parts in the several figures.

The present invention relates to machines for making insulated nails for securing telephone wires to woodwork.

It has been proposed to secure telephone wires to woodwork by an insulated nail comprising a nail, the head of which is embedded in a wooden block provided with a fibre cap for binding the block in compressed condition on the nail.

The object of the present invention is to produce an automatic machine for making the insulated nail hereinbefore referred to.

To the accomplishment of this object, and such others as may hereinafter appear, the various features of the present invention relate to certain devices, combinations and arrangements of parts fully set forth hereinafter, the advantages of which will be readily understood by those skilled in the art.

The various features of the present invention will be readily understood from an inspection of the accompanying drawings illustrating the best form of the invention at present devised, in which,

Fig. 6 is a detail in left side sectional elevation;

Fig. 7 is a detail in front elevation, partly in section, showing the operation of the insulated nail forming mechanism;

Fig. 8 is a detail similar to Fig. 7, but showing the operation of the insulated nail ejecting mechanism;

Fig. 9 is a detail in sectional plan of the nail transferring and fibre feeding mechanisms;

Fig. 10 is a detail in left side elevation of the parts shown in Fig. 9;

Fig. 11 is a detail in left side elevation, partly in section, of the nail pot and associated parts;

Fig. 12 is a detail in front elevation, partly in section, of the parts shown in Fig. 11;

Fig. 13 is a detail in plan, partly in section, of the parts shown in Fig. 11;

Fig. 14 is a plan of the block pot;

Fig. 15 is a front elevation of the block pot;

Fig. 16 is a left side sectional elevation of the block pot;

Fig. 17 is a broken front elevation of the fibre tempering apparatus;

Fig. 18 is a plan of the fibre tempering apparatus;

Fig. 19 is a detail of the electric heating apparatus for heating the water in the tank of the fibre tempering apparatus;

Fig. 24 is a sectional detail of the block transferring station;

Fig. 25 is a sectional detail of the block center punching station;

Fig. 26 is a sectional detail of the nailing station;

Fig. 27 is a sectional detail of the insulated nail forming station, the various parts being in their normal inoperative positions;

Fig. 28 is a sectional detail of the insulated nail forming station, the dinker having operated to dink out the fibre cap;

Fig. 29 is a sectional detail of the insulated nail forming station, the plunger operating to force the assembled nail block and cap up through the dinker;

Fig. 30 is a sectional detail of the insulated nail forming station, the various parts being in their final nail forming position, and Fig. 31 is a detail in sectional elevation of the insulated nail made by the machine.

Figure 1:
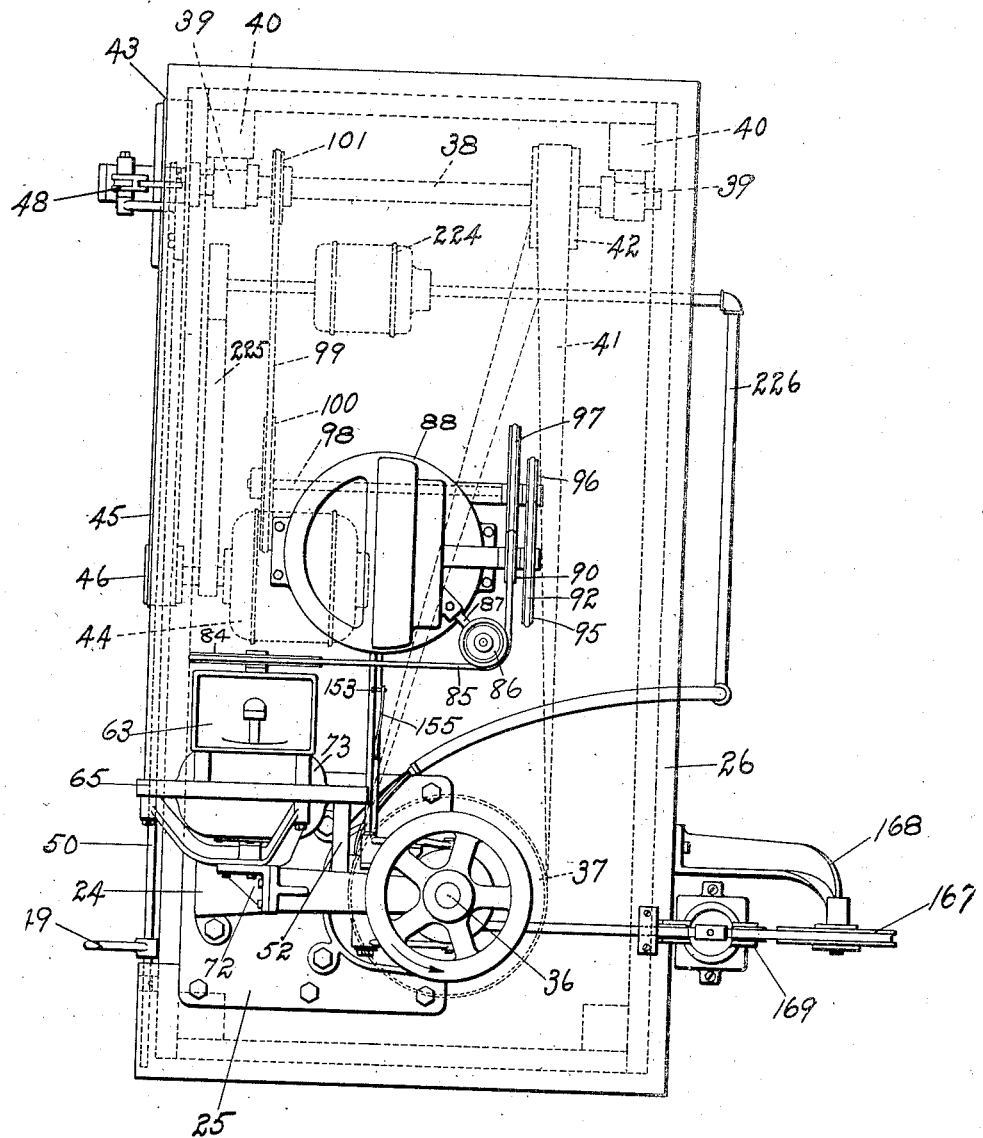
Figure 1 is a plan.

The insulated nail (Fig. 31) produced by the machine embodying the features of the present invention comprises a nail 1 having a wooden cleat 2 thereon which is provided with a teat 3 to facilitate its passage between a pair of telephone wires 4. The cleat 2 is compressed upon the nail 1 and is bound in compressed condition on the nail by a binder or cap 5 molded from a disk of fibre.

Figure 23:
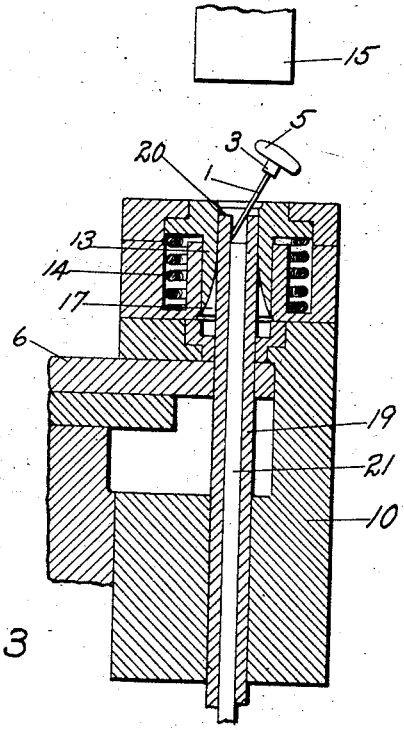
Fig. 23 is a sectional detail showing the operation of the nail ejecting mechanism.

Referring now to Figs. 23 to 30 for a preliminary general description of the machine for making the insulated nail illustrated in Fig. 31, the three materials used in making the insulated nails, namely, the nails 1, the cylindrical wooden blocks for the cleats 2, and the fibre for the caps 5, are stored in storage stations from which they are drawn as needed and assembled at a forming station where the three parts of the insulated nail are united. To this end the machine is provided with a rotary plate 6 (Figs. 6, 9, 10, 24 to 30) having ten pockets 7 therein (Fig. 9). The plate 6 is rotated in a step by step manner to register each of the pockets 7 successively with an opening 8 at a block inserting station A (Figs. 9 and 24). The inserted block 2 is carried during the next rotative movement of the plate 6 to a block center punching station B (Figs. 9 and 25) where the block 2 is punched at 9 to accurately determine the position of the nail 1 which is driven through the block 2 at a nail driving station C (Figs. 9 and 26) which the block reaches at the end of the second rotative step of the plate 6. At the end of the seventh rotative step of the plate 6 (Fig. 9) the block and nail are registered at the nail forming station D (Figs. 9, 27 to 30). At the station D the block and nail are positioned within a die holder 10 having supporting ways 11 for a strip of fibre 12 (Fig. 27). The die holder 10 is provided with a dinker 13 which dinks out a disk or cap 5 (Fig. 28) from the strip of fibre. The dinker 13 is normally held elevated to clear the strip of fibre by a coiled spring 14 and is depressed to dink out the cap 5 by a plunger 15 having a button shaped cavity 16 therein which cooperates with the upper end of the dinker to form a die cavity 18. After the cap 5 is dinked out of the strip of fibre by the dinker 13 a plunger 19 (Fig. 28) is elevated and lifts the block with its contained nail out of the pocket 7 and pushes the assembled cap, block and nail up through the restricted throat 17 of the dinker (Fig. 29). During this movement of the plunger 19 the cap 5 is provided with a circumferentially depending skirt molded over the top of the block 2 into the wood of which it slightly sinks (Fig. 29). Thereafter continued elevation of the plunger 19 forcibly pushes the nail, block and molded cap into the die cavity 18 (Fig. 29) whereupon the block is compressed upon the nail and molded within the depending skirt of the cap. At the same time the upper end 20 of the plunger 19 forms the teat 3. The plunger 15 is then elevated and an ejector 21 is pushed up through the plunger 19 to eject the formed insulated nail from the machine (Fig. 23).

The plate 6 (Fig. 6) moves during its rotative movement over a stationary disk 22 (Figs. 5 and 6) supported upon the upper end of a long bearing 23 formed in an extension piece of a vertical girder 24 (Fig. 2) having at its lower end a horizontal plate 25 (Fig. 1) bolted to the top of a table 26. The plate 6 is secured to a collar 27 (Figs. 5 and 6) on a vertical shaft 28 journaled in the bearing 23 and another bearing 29 (Fig. 2) formed on a girder 30 bolted to the bottom of the plate 25. At its lower end the shaft 28 carries a pin wheel 31 which is driven intermittently by an irregular worm 32 on a short shaft 33 journaled in the girder 30. The shaft 33 carries a bevel gear 34 which meshes with a similar gear 35 on a vertical shaft 36 journaled in the girders 24 and 30. The shaft 36 is provided with a pulley 37 (Fig. 1) which is driven from a counter shaft 38, journaled in bearings 39 carried by the rear legs 40 of the table 26, by a belt 41 which passes around the pulley 37 and a pulley 42 on the shaft 38. The shaft 38 carries a loose pulley 43 which is driven from a motor 44 on a bottom shelf on the table 26 by a belt 45 passed over the pulley 43 and a pulley 46 on the motor shaft. The pulley 43 may be clutched to the shaft 38 to transmit motion thereto by an internal clutch member, splined on the shaft 38, and operatively connected, for movement into and out of engagement with the pulley 43, to a toggle 48 which is made and broken by manipulation of a handle 49 connected to a rock shaft 50 journaled in the table 26 and suitably connected to one of the links of the toggle 48. With these connections the plate 6 is rotated in a step by step manner to register the pockets 7 successively with the block inserting station A (Figs. 9 and 24) at which station the blocks are inserted, one at a time, in the plate 6.

Figure 2:
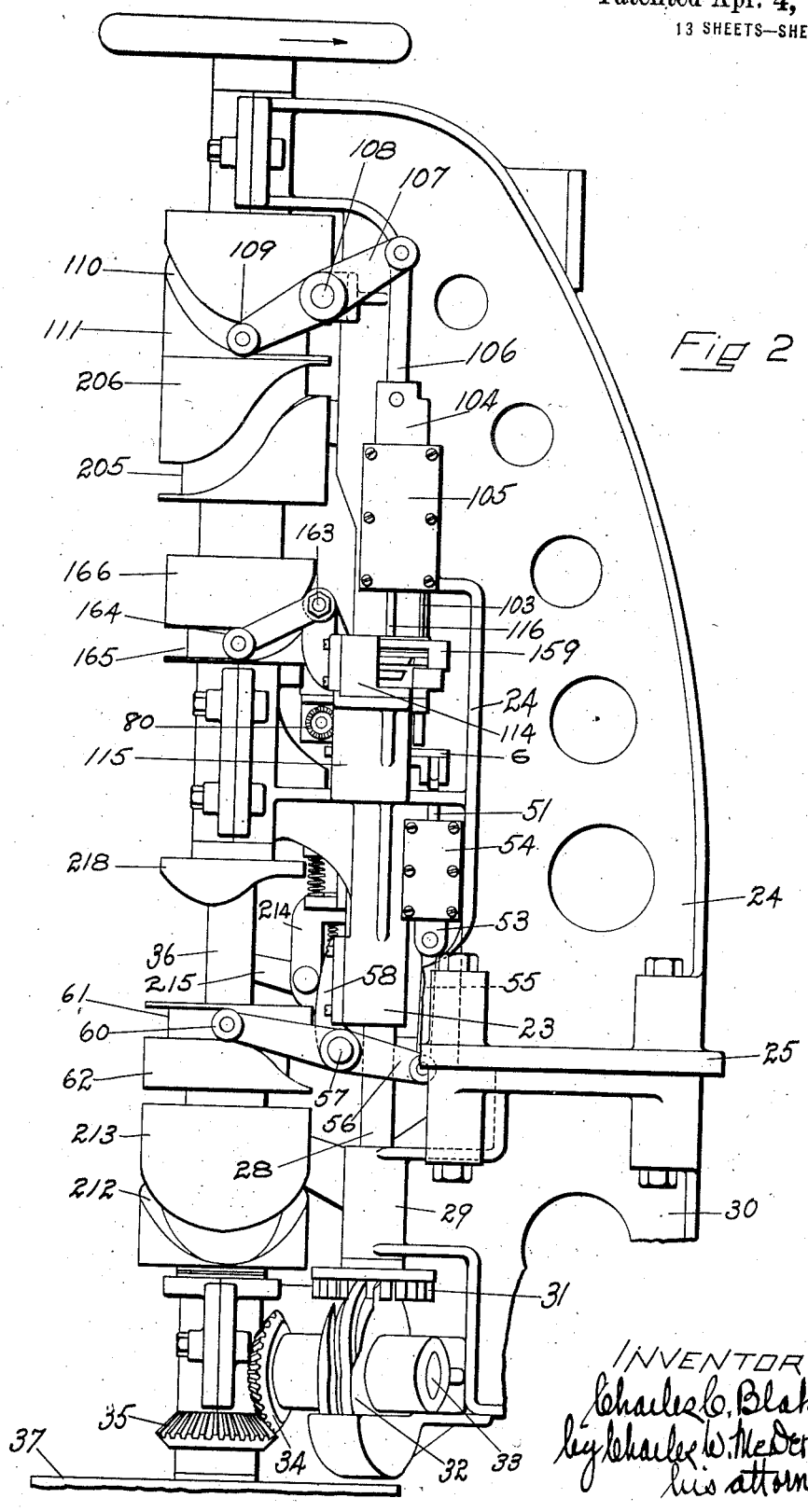
Fig. 2 is a detail in right side elevation of a portion of the machine.
Figure 5:
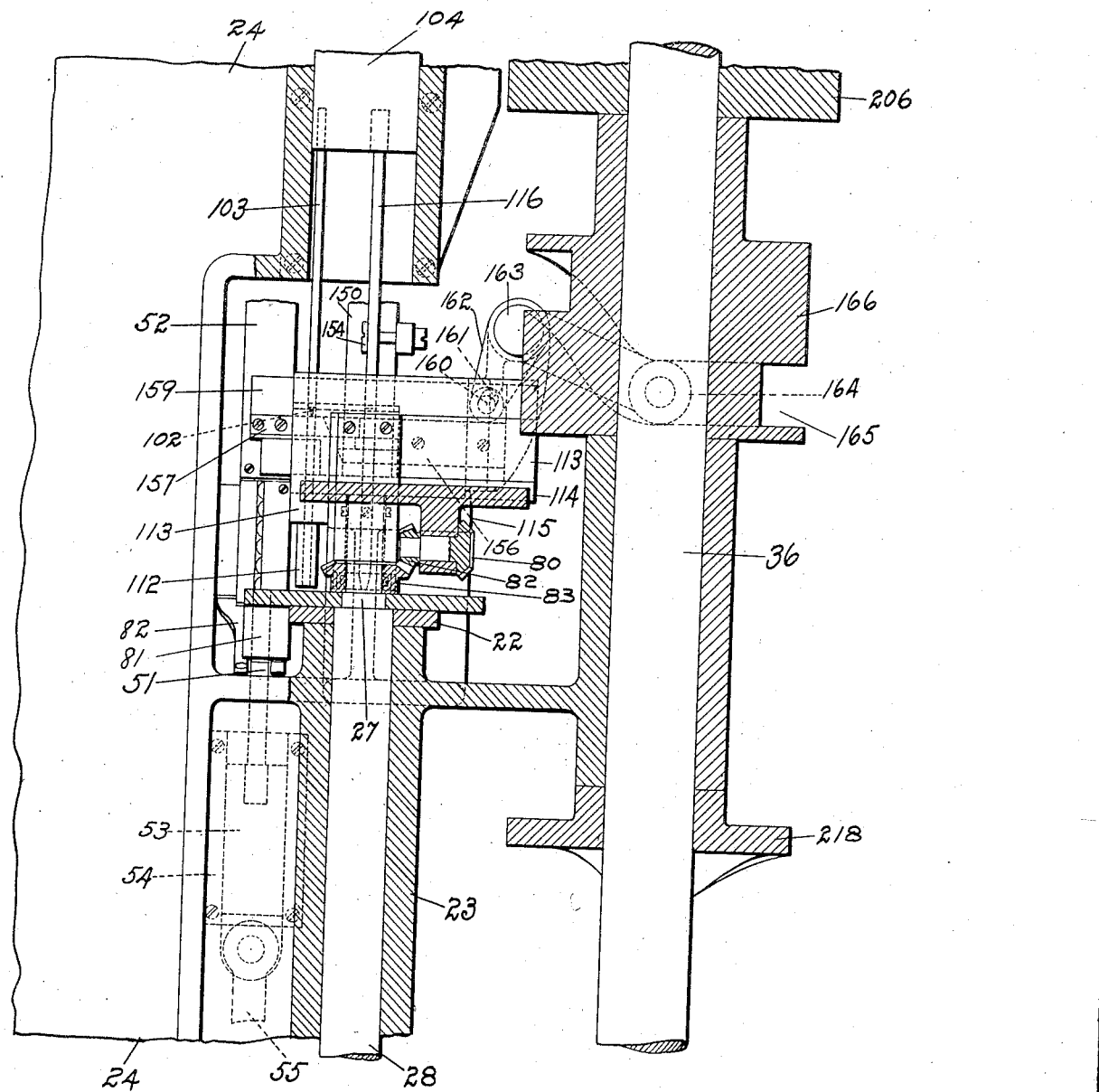
Fig. 5 is a detail in front sectional elevation.

To this end the machine is provided with a block transferrer 51 (Figs. 2, 5, 10 and 24) which lifts the blocks 2, one at a time, from a chute 52 (Figs. 3, 5, 9, 10, 15 and 24) and inserts them in the plate 6. The block transferrer 51 is secured to a slide 53 (Fig. 5) mounted to slide in ways formed on the girder 24 beneath a cover plate 54 (Figs. 2 and 5). The slide 53 is connected by a link 55 (Fig. 2) to one end of a lever 56 pivoted on a stud 57 supported by a bracket 58 secured to the bearing 23. The other end of the lever 56 is provided at its free end with a roll 60 engaging a cam groove 61, formed in the peripheral face of a disk 62 on the shaft 36 and shaped to give the proper reciprocating movement to the transferrer 51 through the connections described.

The blocks 2 are introduced into the machine initially through a magazine 63 (Fig. 16) formed on a frame 64 which is connected to a ring 65 by three bolts 66, 67 and 68 (Fig. 15). The ring 65 is connected to a three-armed spider 69 by the bolt 67 and two other bolts 70 and 71 (Fig. 15). The spider 69 is bolted to a bracket 72 (Fig. 14) bolted to the girder 24. When the blocks 2 are thrown into the magazine 63 they fall into a pot 73 bolted to a disk 74 secured to a horizontal shaft 75 journaled in the magazine frame 64 and spider 69. The pot 73 is made in two pieces secured together by fastenings 76 so as to leave a central slot 77 between the two sections, shaped to permit the blocks in the pot to slip edgewise therethrough.

The pot 73 is rotated in the direction of the arrow (Fig. 15) and as the pot rotates the blocks fall edgewise into the slot 77 and against the inside wall of the ring 65 along which they roll until they arrive at an opening 78 in the ring which registers with the chute 52. If the chute 52 is empty the blocks 2 roll to the right (Fig. 15) into the chute. If the chute is full, as shown in Fig. 15, the blocks 2 collect in a pocket 78ª adjacent the opening 78 and these collected blocks cause the blocks in the slot 77 to roll to the left (Fig. 15) and drop back into the pot. The chute 52 is provided with a central way 79 for the passage of the blocks 2 and this way and the pocket 78ª are covered with a cover 80 of transparent material to permit inspection.

Figure 4:
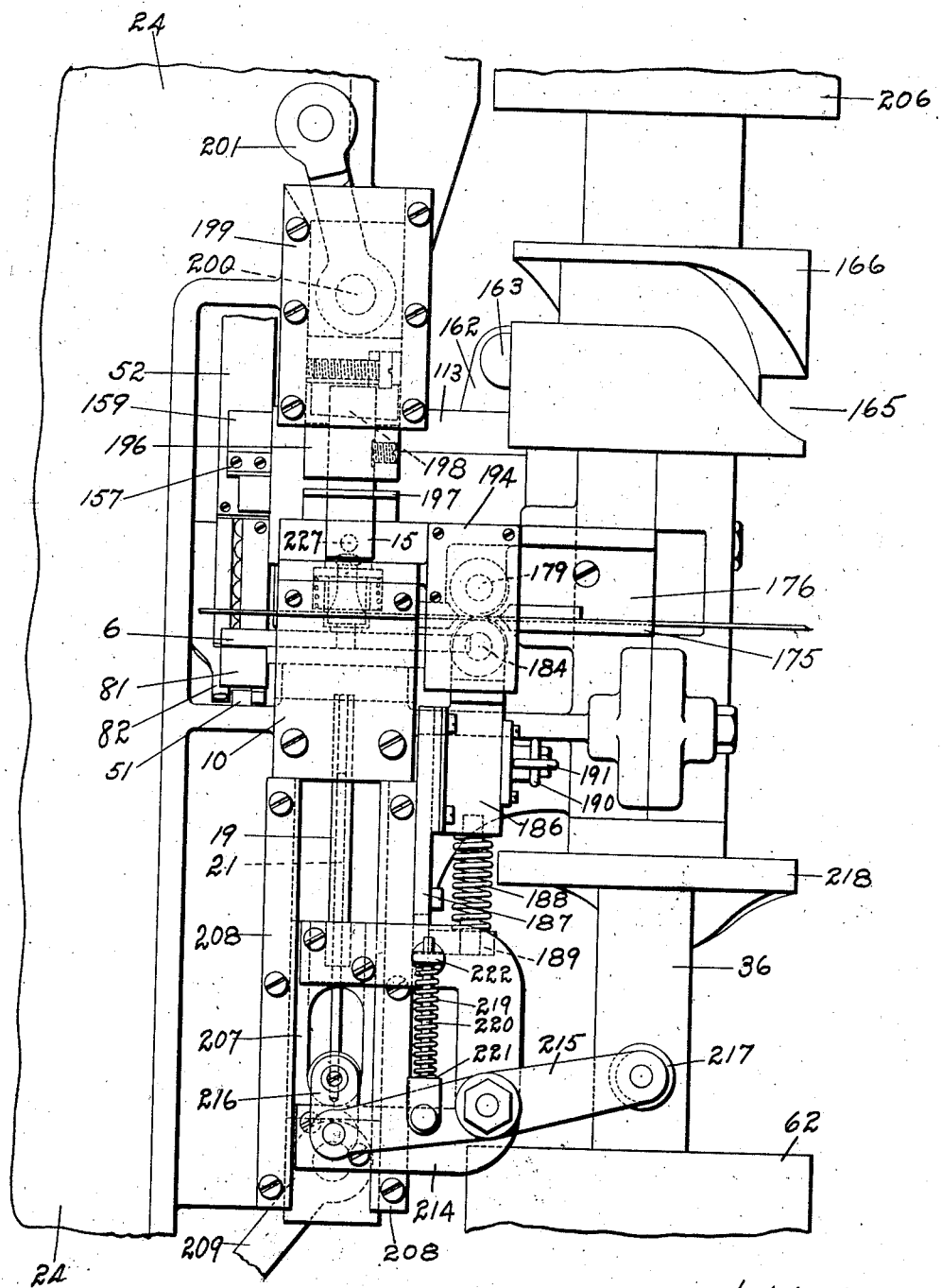
Fig. 4 is a detail in front elevation.

The chute 52 is connected at its upper end to the ring 65 (Figs. 15 and 16). At its lower end the side walls of the chute are extended to straddle a terminal 81 (Fig. 24) which forms a limiting stop for the blocks. The extended ends of the chute rest upon the tie plate joining the bearing 23 to the girder 24 (Fig. 4). In order to permit the chute to be cleared of blocks without running the blocks through the operating mechanism of the machine the extended leg 82 of the chute on the left (Fig. 4) is made removable. To this end the leg 82 of the chute is separate from the rest of the chute and carries a thumb screw 83 (Fig. 10) by means of which the leg 82 may be secured to the chute 52 or detached therefrom when it is desired to clear the chute of blocks.

In order to rotate the pot 73 the shaft 75 is provided with a pulley 84 (Figs. 14 and 16) driven from a belt 85 the upper and lower bights of which are deflected by a pair of idlers 86 (Figs. 1 and 13) rotatably mounted on a bracket 87. The bracket 87 is secured to a casting 88 mounted upon the upper ends of a pair of legs 89 rising from the top of the table 26. The belt 85 is driven by a pulley 90 (Figs 1, 12 and 13) on a horizontal shaft 91 journaled in the casting 88.

The shaft 91 is driven by a crossed belt 92 from a horizontal shaft 93 (Fig. 11), journaled in a plate 94 bridging the legs 89, which passes over pulleys 95 and 96 on the shafts 91 and 93, respectively. The shaft 93 is driven by a belt 97 from a shaft 98 (Fig. 1) journaled in bearings supported from the undersurface of the top of the table 26, which passes over pulleys on the shafts 93 and 98. The shaft 98 is driven from the shaft 38 by a belt 99 which passes over pulleys 100 and 101, on the shafts 98 and 38, respectively.

In order to centerpunch the block at the station B the machine is provided with a center punch 102 (Fig. 25) formed on the lower end of a rod 103 (Fig. 5). The rod 103 is carried by a slide 104 mounted to slide in ways formed on the girder 24 beneath a cover plate 105 (Fig. 2) secured to the girder 24. The slide 104 is connected by a link 106 to one end of a lever 107 pivoted on a stud 108 carried by the girder 24. The other end of the lever 107 is provided with a roll 109 engaging a cam groove 110 formed in a cylindrical cam 111 on the shaft 36. The center punch 102 is guided in its vertical movements by a tube 112 (Fig. 5). The tube 112 is carried by a block 113 supported by a horizontal ledge on a block 114 which is secured to a flat surface 115 formed on the girder 24.

The slide 104 (Fig. 5) also carries a nail driver 116 which operates within a nail passage 117 (Fig. 6) formed in the block 113 to drive a nail through the block located at the station C. The passage 117 registers with an opening 118 formed in a cylindrical throat 119 screwed into the plate 114. The nail is centered in the throat for the operation of the driver by yielding sections 120 (four in number) mounted to slide upon the bottom of the throat 119. The sections are normally held together by leaf springs 121, one for each section, each spring being secured at its opposite ends to the throat and section piece, respectively. The springs 121 normally hold the sections closed to hold a nail in the position illustrated in Fig. 6. When the driver engages the nail the sections open under the driving pressure. The extent to which the sections open is limited by a ring 122, surrounding the sections, secured to the block 113.

The nails are stored in a hopper 123 (Figs. 11, 12 and 13) fastened to a bed plate 124 therefor which is detachably connected to a flat surface 125 secured to a stud 126 rotatably mounted in the plate 94. The bed plate 124 is provided with a key way 127 so that the plate may be slid into place by engagement of the way 127 with a key 128 formed on the surface 125. The bed plate 124 is secured in position by a pin 129 arranged to pass centrally through the stud 126, key 128 and into a hole 130 formed in the bed plate.

The hopper 123 rotates within a ring 131 (Fig. 11) formed on a hood 132 cast with the casting 88. In order to rotate the hopper 123 the surface 125 is formed on a worm wheel 133 which is driven by a worm 134 on the shaft 93. During the rotation of the hopper 123 the nails are picked therefrom by a pair of pickers 135 and 136 and transferred to a raceway 137 mounted entirely within the pot 123. The raceway 137 is secured to a disk 138 carried by the hood 132 in such manner that the upper surface of the raceway registers with a slabbed-off surface 139 on the disk (Fig. 11).

The pickers comprise a curved bar having a central slot 140 (Figs. 12 and 13) therein so that as the picker sweeps through the mass of nails in the hopper the shanks of some of the nails will enter the slot 140 with the heads of the nails resting on the surface 141 (Fig. 11). Each picker is secured to a pair of pins 142 projecting laterally from an arm 143 loosely mounted on a plate 144 carried by a disk 145 mounted on the shaft 91. The arms 143 during the time the pickers sweep through the mass of nails in the hopper 123 hang downwardly under the influence of gravity against a pin 146 on the plate 144 as shown in the case of the arm 143 for the picker 135 in Fig. 11. As the picker 135 moves in the direction of the arrow (Fig. 11) the arm 143 leaves the pin 146 and a curved surface 147 on the picker engages and rides upon the peripheral edge of the disk 138 until the slabbed-off surface 139 is reached at which time the nails caught by their heads on the surface 141 on the picker slide off the picker into the raceway 137. Thereafter during the continued rotation of the shaft 91 the picker 135 reaches a position where it must fall forwardly under the influence of gravity until the arm 143 thereof strikes against the pin 146. The sudden stop of the fall of the picker is sufficient to jar loose any nails on the picker which, for some cause, were not delivered to the raceway 137, and cause them to fall back into the hopper 123. The pickers during the movements described for them are held from lateral play by a disk 148 on the shaft 91.

Figure 20:
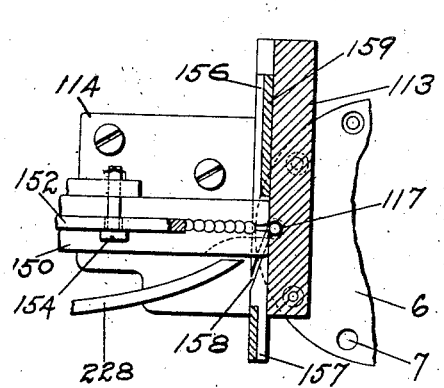
Fig. 20 is a detail in sectional plan of the nail transferring mechanism.

The nails delivered to the raceway 137 slide down the raceway, jump a gap 149 (Fig. 11) and land upon a second raceway 150 secured at one end upon a bracket 151 on the plate 94 and at its other end upon the plate 114 (Fig. 6). The object of the gap 149 is to permit the nails to drop back into the pot when the raceway 150 is full of nails. The raceway 150 is provided with a central roadway for the nails, leading directly into the passage 117 (Fig. 20) the heads of the nails sliding upon the top of the raceway with the shanks of the nails depending in the roadway (Fig. 6). The roadway of the raceway is covered by a guard 152 loosely mounted upon a pair of horizontal studs 153 (Fig. 1) and 154 (Figs. 9 and 10), the guard being held against the heads of the studs by a leaf spring 155 (Fig. 1).

Figure 21:
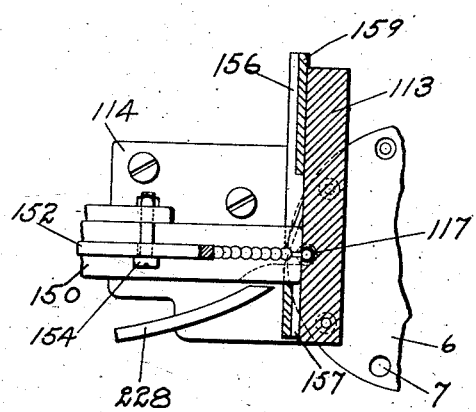
Fig. 21 is a detail similar to Fig. 20 showing the transferring mechanism in another position.

In order to transfer the nails from the raceway 150 to the nail passage 117 the machine is provided with a pair of steel blades 156 and 157 (Figs. 20 and 21) arranged so that there is an inclined slot 158 between them. The blades are connected to a slide 159 (Fig. 5) arranged to slide in ways formed on the back of the block 113 (Fig. 10). The slide 159 is provided with a lateral pin 160 (Fig. 5) which is embraced by a slot 161 formed in the vertical arm of a bell crank lever 162 pivoted on a stud 163 carried by the girder 24. The horizontal arm of the bell crank lever is provided with a roll 164 engaging a cam groove 165 formed in a cylindrical cam 166 on the shaft 36 and shaped to impart reciprocating movements to the blades 156 and 157 through the connection described. When the blades are in the position of Fig. 20 a nail has just been transferred from the raceway to the nail passage 117, the lowermost nail in the raceway being then held back by engagement with the blade 156. When the blades move into the position of Fig. 21 the lowermost nail in the raceway drops into the opening of the inclined slot 159 along which it is transferred until it drops into the passage 117 upon the next reciprocating movement of the blades.

Figure 22:
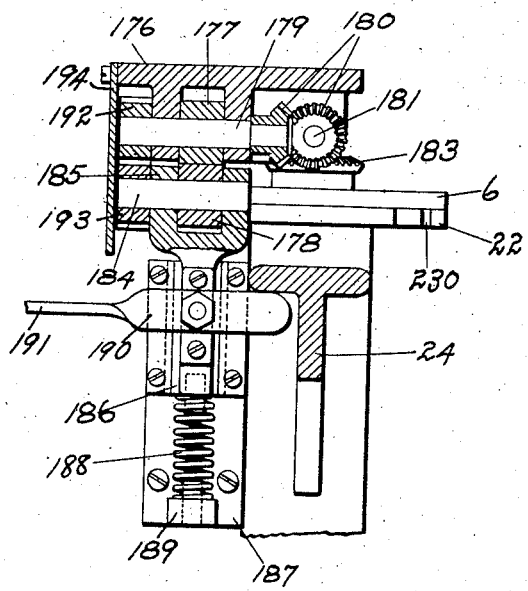
Fig. 22 is a sectional detail showing the roll feed for the fibre.

The strip of fibre for the cap 5 is stored in a reel 167 (Fig. 1) mounted on a bracket 168 rising from the table 26. The strip of fibre passes from the reel over a guide roll 169 (Figs. 1 and 17), secured to a cylindrical tank 170, beneath a roll 171 mounted on a plunger 172 loosely contained with the tank 170, over a guide roll 173 similar to the guide roll 169, between a tension device 174 (Fig. 17) and over upon a platform 175 formed on a bracket 176 secured to the girder 24. The platform 175 leads the strip to the supporting ways 11 in the die holder 10. The fibre is fed through the die holder by a pair of feed rolls 177 and 178 (Figs. 7, 8 and 22). The upper feed roll 177 is mounted on a shaft 179, journaled in the bracket 176, which is driven through the bevel gears 180 from a short shaft 181 also journaled in the bracket 176. The shaft 181 is provided with a bevel gear 182 which is driven by a bevel gear 183 secured to the upper end of the shaft 28 (Fig. 6).

The lower feed roll 178 is mounted on a shaft 184 journaled in a yoke 185 carried by a vertical slide 186 mounted to slide on the side of one of a pair of ways 187 formed on the girder 24. The roll 178 is yieldingly impelled towards the roll 177 by a spring 188 interposed between the slide 186 and a boss 189 on the way 187. In order to separate the rolls against the pressure of the spring 188 the slide carries a pivoted lever 190, one end of which engages a convenient part of the girder 24, and the other end of which is formed as a handle 191. The shaft 184 is driven from the shaft 179 by a gear 192 on the shaft 179 which engages a gear 193 on the shaft 184. The gears 192 and 193 are covered by a gear guard 194.

In order to temper the strip of fibre the tank 170 is filled with water which is maintained at a temperature of substantially 180 degrees F., by an electric heating apparatus 195 (Figs. 17 and 19) mounted in the base of the tank.

The plunger 15 (Figs. 27 to 30) which actuates the dinker 13 and at the same time cooperates with the dinker to form the die cavity 18 is connected to a slide 196 (Fig. 6) and is guided in its vertical movements by a plate 197. The plunger 15 is connected to the slide through a movable wedge 198 so that an adjustment may be effected between the slide and the plunger. The slide 196 slides in ways formed on the girder 24 beneath a cover plate 199. The slide 196 is provided with a pin 200 upon which is pivoted a link 201 pivoted to the vertical arm of a bell crank lever 202 pivoted on a stud 203 secured to the girder 24. The horizontal arm of the bell crank lever 202 is provided with a roll 204 (Fig. 3) engaging a cam 205, formed in a cylindrical cam 206 on the shaft 36, and shaped to impart proper reciprocating movements to the plunger 15 through the connections described.

Figure 3:
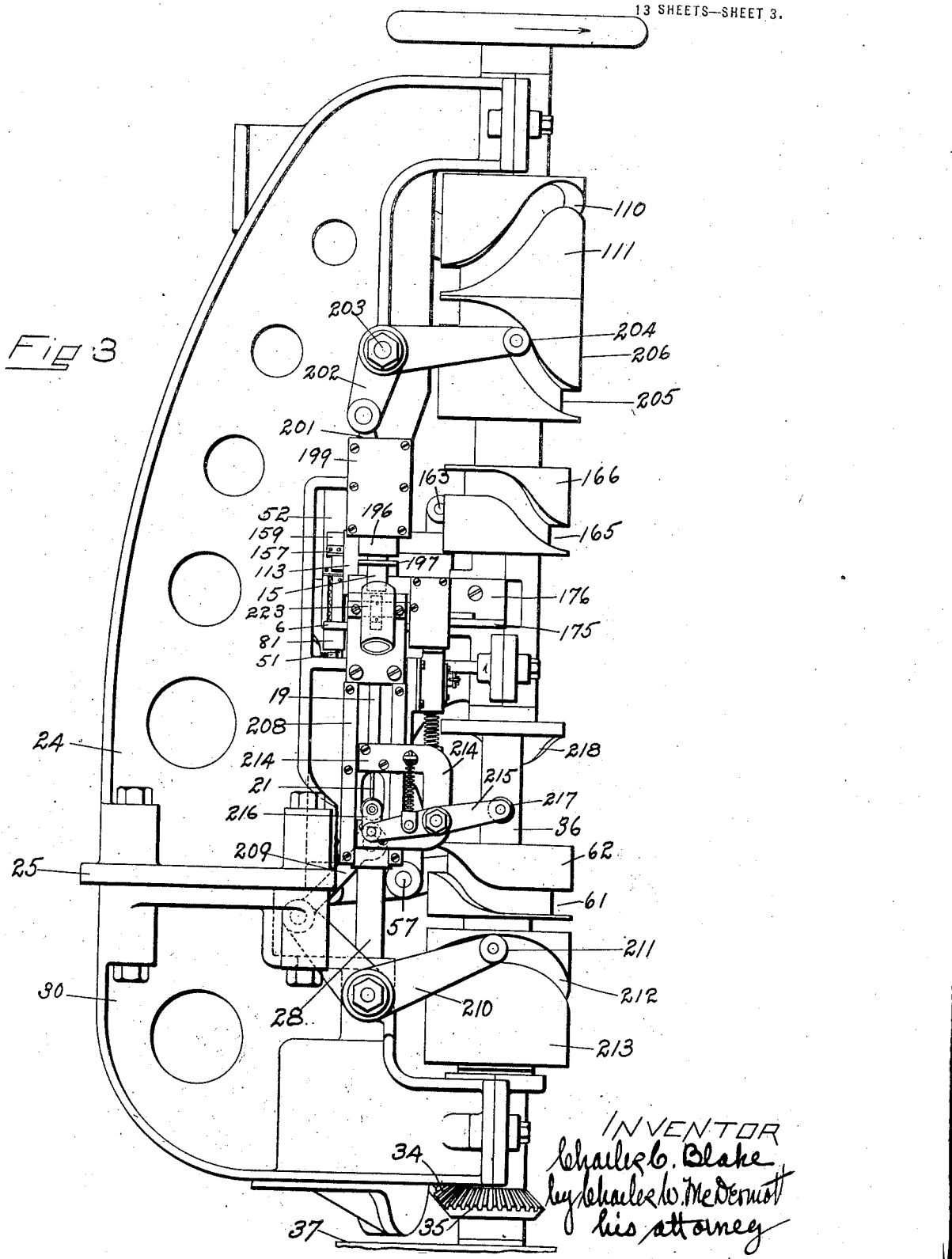
Fig. 3 is a detail in left side elevation of the portion of the machine illustrated in Fig. 2.

In order to actuate the plunger 19 (Figs. 27 to 30) which forces the assembled nail, block and cap up through the dinker 13 and into the die cavity 18 the plunger 19 is secured to a slide 207 (Figs. 6, 7 and 8) mounted to slide in the ways 187 beneath cover plates 208 (Fig. 3). The slide 207 is connected by a link 209 (Fig. 3) to one arm of a bell crank lever 210 pivoted on the girder 30 and having a roll 211 engaging a cam groove 212 formed in a cylindrical cam 213 on the shaft 36, and shaped to impart proper reciprocating movements to the plunger 19 through the connections described.

After the insulated nail has been formed the plunger 15 is elevated and the ejector 21 (Fig. 23) is then actuated to eject the insulated nail from the machine. To this end the slide 207 carries a yoke 214 (Fig. 7) upon which is pivoted a lever 215 having one end connected by a link 216 to the ejector 21. The other end of the lever 215 is provided with a roll 217 which at the proper time in the elevation of the plunger 19 is engaged by a cam 218 on the shaft 36. The ejector 21 is returned to its original position relatively to the plunger 19 upon the return of the plunger to its lowermost position by a spring 219. The spring 219 is coiled around a rod 220, pivoted to the lever 215, and interposed between a shoulder 221 on the rod and a lug 222, on the yoke 219, through which the rod 220 loosely passes.

The ejected insulated nail falls into a chute 223 (Fig. 6). In order to insure that the nail will fall into the chute 223 the machine is provided with a blower 224 (Fig. 1) driven by a belt 225 from the shaft of the motor 44. A pipe 226 leads from the blower and this pipe feeds three other pipes 227, 228 and 229. The pipe 227 terminates at a point back of the station D (Fig. 6) so as to blow the ejected insulated nail into the chute 223. The pipe 228 (Fig. 20) terminates at a point adjacent the raceway 152 so that the air therefrom may aid in transferring the nails into the nail passage 117. The pipe 229 (Fig. 10) terminates at the station B to blow chips produced in the center punching operation out of the machine.

In operating the machine the pot 73 (Fig. 16) is provided with blocks, the pot 123 (Fig. 11) with nails, and a roll of fibre is placed upon the reel 167 (Fig. 1). The loose end of the fibre is then conducted through the tank 170 (Fig. 17) and left upon the platform 175 (Fig. 4) temporarily. The machine is then started by manipulation of the handle 49 (Fig. 1). Upon starting the machine the transferrer 51 (Fig. 24) transfers a block from the chute 52 to the pocket 7, in the plate 6, located at the station A (Fig. 24). Simultaneously with the operation of the transferrer 51 the center punch 102 and nail driver are operated but as there are no blocks located at the stations B and C (Figs. 25 and 26) nothing happens. If at this time a nail happens to be located in the throat 121 (Fig. 6) it is driven through the pocket 7 at the station C and out of the machine through an opening 230 (Fig. 6). After the tools 51, 102 and 116 are operated and withdrawn the plate 6 is rotated a step to transfer the block located in the plate at the block transferring station A to the block center punching station B. During this movement of the plates 6 a nail is withdrawn from the end of the raceway 150 and transferred into the passage 117 from which it drops into the throat 119. The plate 6 is rotated step by step and blocks are placed therein which are operated upon successively by the block center punching tool and nail driving mechanism until a block with the nail therein approaches the forming station D (Fig. 9). The machine is then stopped and the end of the strip of fibre lying loosely on the platform 175 (Fig. 4) is first positioned between the feed rolls 177 and 178 (Figs. 9 and 22) and then through the ways 11 (Fig.

27) in the die holder 10. The machine is then started. While the tools are operating at the stations A, B and C the plunger 15 is actuated to form the die cavity 18 and depress the dinker 13 to dink out a disk from the strip of fibre. Thereafter the plunger 19 drives the block with its contained nail against the disk which is carried with the block and nail upwardly through the dinker 13. This dinker is shaped to provide the fibre disk with a circumferentially depending skirt (Fig. 29) sunk slightly into the wood of the block. The plunger 19 drives the assembled cap, block and nail into the die cavity 18 thus compressing the block on the nail and molding the cap over the nail to bind the block upon the nail in compressed condition. At the same time the end 20 of the plunger 19 forms the teat 3 (Fig. 31). Thereafter the plunger 15 is withdrawn thus allowing the spring 14 (Fig. 23) to elevate the dinker 13 to its original position. At the same time the ejector 21 is pushed up through the plunger 19 and ejects the finished nail from the machine (Fig. 23). During the operation of the machine blocks and nails are withdrawn from the block and nail pots and fed to the chute 52 and raceway 150, respectively, in readiness for transferral to the pocket 7 at the station A and the throat 121 at the station B. The fibre is fed through the ways 11 by the rolls 177 and 178 the waste fibre strip 231 passing out of the machine as shown in Fig. 9. The machine operates at a high speed making substantially 300 insulated nails a minute.

Obviously, changes may be made in the form, character and relation of the parts herein described, within the scope of the invention, characterizing features of which are set forth in the claims by the intentional use of generic terms and expressions inclusive of modifications.

What is claimed as new, is:

1. A capping machine, having, in combination, a die holder; means for feeding the material for the cap through the die holder; a tubular die, mounted in the holder, having a cutting edge on its bottom and a die cavity on its top; means for normally holding the die elevated to permit the feed of the cap material through the die holder; means for closing the die cavity and depressing the die to dink a cap from the cap material; and means for forcing the cap and the material to be capped up through the die into the closed die cavity.

2. A capping machine, having, in combination, a die holder; means for feeding the material for the cap through the die holder; a tubular die, mounted in the holder, having a cutting edge on its bottom and a die cavity on its top; means for normally holding the die elevated to permit the feed of the cap material through the die holder; means for closing the die cavity and depressing the die to dink a cap from the cap material; means for forcing the cap and the material to be capped up through the die into the closed die cavity; means for ejecting the capped material from the die, and means for operating said ejecting means before said forcing means is withdrawn from the die.

3. A capping machine, having, in combination, a die holder; means for feeding the material for the cap through the die holder; means for feeding the material to be capped into the die holder; a tubular die, mounted in the holder, having a cutting edge on its bottom and a die cavity on its top; means for normally holding the die elevated to permit the feed of the cap material through the die holder; means for closing the die cavity and depressing the die to dink a cap from the cap material, and means for forcing the cap and the material to be capped up through the die into the closed die cavity.

4. A capping machine, having, in combination, a die holder; means for feeding the material for the cap through the die holder; means for feeding a compressible block into the die holder; the die holder having means for dinking a cap out of the cap material; a die; and means for forcing the cap and block through a portion of the die to provide the cap with a circumferentially depending skirt molded over one end of the block and sunk into the peripheral surface of the block.

5. A capping machine, having, in combination, a die holder; means for feeding the material for the cap through the die holder; means for feeding a compressible block into the die holder; the die holder having means for dinking a cap out of the cap material; a die; and means for forcing the cap and block first through a portion of the die to provide the cap with a circumferentially depending skirt molded over one end of the block and then into another portion of the die to compress the block and mold the cap on the compressed block.

6. A capping machine, having, in combination, a die holder; means for feeding the material for the cap through the die holder; means for feeding a compressible block into the die holder; the die holder having means for dinking a cap out of the cap material; a die and means for forcing the cap and block first through a portion of the die to provide the cap with a circumferentially depending skirt molded over one end of the block and then into another portion of the die to compress the block and mold the cap on the compressed block comprising a plunger having one end thereof shaped to form a teat on the compressed block.

7. An insulated nail machine, having, in combination, a die; a plunger cooperating with the die to form the insulated nail therein, an ejector for ejecting the insulated nail from the die, and mechanism for successively operating the plunger and ejector comprising a slide arranged to support the plunger and ejector independently, means for operating the slide and separate means for operating the ejector.

8. An insulated nail machine, having, in combination, a die holder; an open ended tubular die mounted in the die holder adapted to receive the nail through one open end; means cooperating with the other end of the die to form an enclosed die cavity; and a plunger cooperating with the under side of the nail head to form the insulated nail in said die cavity.

9. An insulated nail machine, having, in combination, a die holder; an open ended tubular die mounted in the die holder adapted to receive the nail through one open end; means cooperating with the other end of the die to form an enclosed die cavity; a plunger cooperating with the under side of the nail head to form the insulated nail in said die cavity, and an ejector for ejecting the insulated nail from the die.

10. A cap forming machine, having, in combination, a support; means for feeding the cap material over the support; a dinker normally held above the support; and means for depressing the dinker to dink out a cap comprising a plunger, a slide therefor, an adjustable connection between the plunger and the slide, and mechanism for reciprocating the slide.

11. A cap forming machine, having, in combination, a support; means for feeding the cap material over the support; a dinker normally held above the support; means for depressing the dinker to dink out a cap comprising a plunger, a slide therefor, an adjustable connection between the plunger and the slide, and mechanism for reciprocating the slide; and means for providing the cap with a circumferentially depending skirt comprising a die and mechanism for forcing the cap into the die.

12. A machine for making insulated nails comprising a nail, a block and a cap having, in combination, means for assembling the block on one end of the nail, and means for enveloping the ends of said nail and block with the cap.

13. A machine for making insulated nails comprising a headed nail and a block, having, in combination, means for assembling the block on the headed end of the nail, and means for compressing the block about said headed end.

14. A machine for making insulated nails comprising a headed nail and a block having, in combination, means for assembling the block on the headed end of the nail, means for compressing the block about said headed end, and means for securing said compressed block to the end of the nail.

15. A machine for making insulated nails comprising a nail, a block and a cap having, in combination, means for assembling the block on one end of the nail, means for compressing the block and forming a teat thereon at one end, and means for securing the cap to the other end of the compressed block.

16. A machine for making insulated nails, having, in combination, a nailing station including means for driving a nail through a block, a nail storage station including means for transferring nails from the storage station to the nailing station, a carrier for conducting blocks to the nailing station, a block storage station, a block transferring station including means for loading the carrier with blocks, and means for withrawing the blocks from the storage station and delivering them to the transferring station.

17. A machine for making insulated nails, having, in combination, a center punching station for punching blocks, a nailing station for driving the nails therein, and a carrier for carrying the blocks to the various stations.

18. A machine for making insulated nails, having, in combination, a center punching station for punching blocks, a nailing station for driving the nails therein, a forming station for forming the completed nail, and a carrier for carrying the blocks to the various stations.

19. A machine for making insulated nails, having, in combination, a center punching station for punching blocks, a nailing station for driving the nails therein, a forming station for forming the completed nail, a carrier for carrying the blocks to the various stations, an automatic means for loading the carrier with blocks.

20. A machine for making insulated nails, having, in combination, a forming station for forming the nail, means for feeding a strip of fibre through the station, and means located at the station for dinking a disk out of the strip of fibre.

21. A machine for making insulated nails, having, in combination, a forming station where the different parts of the nail are formed, means for supporting a block having a nail assembled therewith at the station, means for feeding a strip of fibre through the station, means located at the station for dinking out a cap from the strip of fibre, and mechanism for compressing the block upon the nail and molding the cap upon the compressed block.

22. A machine for making insulated nails comprising a nail, a solid block and a cap, having, in combination, means for forcing the nail through the block, and assembling the nail and block with the cap, and means for molding the cap upon the block.

23. A machine for making insulated nails comprising a nail, a solid block and a cap, having, in combination, means for forcing the nail through the block and assembling the nail and block with the cap, and means for compressing the block about head end of the nail and molding the cap upon the compressed block.

24. A machine for making insulated nails comprising a nail, a block and a cap, having, in combination, means for assembling the nail, block and cap, a die, and means for forcing the assembled parts into the die to form the insulated nail.

25. A machine for making insulated nails comprising a nail, a block and a cap, having, in combination, means for assembling the nail, block and cap, a die, means for forcing the assembled parts into the die to form the insulated nail, and means for ejecting the insulated nail from the die.

26. A machine for making insulated nails comprising a nail, a block and a cap, having, in combination, means for assembling the nail, block and cap, a tubular die open at one end and closed at the other, and means for driving the assembled parts through the open end of the die into the closed end to form the insulated nail.

27. A machine for making insulated nails comprising a nail, a block and a cap, having, in combination, means for assembling the nail, block and cap, a tubular die open at one end and closed at the other, and means for driving the assembled parts through the open end of the die into the closed end to form the insulated nail, means for opening the closed end of the die, and means for ejecting the insulated nail out of the die.

28. A forming machine, having, in combination, a tubular die, means outside the die for closing one end of the die, and means for forcing the material to be formed through the open end of the die into the closed end.

29. A nailing machine, having, in combination, a nail driver, a nail driving passage, a raceway having a roadway leading into the passage, and means for transferring a nail from the roadway into the passage comprising a slide and a pair of blades mounted on the slide spaced apart to form a slot arranged diagonally across the roadway.

30. A machine for making insulated nails comprising a nail, a block and a cap having, in combination, means for successively feeding nails and blocks to an assembling station, means at the assembling station to thread the block on the nail, means for successively delivering said assembled parts to a capping station, means for successively supplying caps in timed relation to the delivery of said parts, and means at the capping station operating to successively secure caps to the blocks.

31. An insulated nail machine having, in combination, a die, a plunger co-operating with the die to form the insulated nail therein, and an ejector for ejecting the nail from the die, said ejector having an ejecting movement in the same direction as the movement of the plunger in forming the nail.

32. An insulated nail machine having, in combination, a die, a plunger co-operating with the die to form the insulated nail therein, and an ejector movable with the plunger in its nail forming movement and then movable relative to the plunger in a continuation of said movement to eject the nail from the die.

33. A machine for making insulated nails having, in combination, nail driving mechanism, means for supplying nails thereto, block feeding mechanism for conveying blocks to said nailing mechanism, a raceway for delivering a succession of blocks, and means for transferring blocks successively from said raceway to said feeding mechanism.

34. A machine for making insulated nails having, in combination, a nailing station including means for driving a nail through a block, a carrier for carrying the blocks one at a time to the nailing station, means for delivering blocks adjacent said carrier, and automatic means for loading said blocks on said carrier successively.

35. A machine for making insulated nails comprising a nail, a wood block and a fibre cap having, in combination, means for assembling said parts with the nail through the block and the cap on the block, and means for compressing the block on the nail and molding said cap on the block.

36. A machine for making insulated nails comprising a nail, a block and a cap having, in combination, means for assembling the nail and block, means for supplying the cap in position adjacent the head of the block on the nail, and means for uniting said parts by compressing the block and simultaneously molding the cap about its head.

37. A machine for making insulated nails comprising a nail, a block and a cap having, in combination, means for assembling the nail and block at one station, means for supplying the cap at another station, feeding mechanism for delivering the assembled nail and block to the capping station, and means for applying pressure to said block and cap to unite said parts.

38. A machine for making insulated nails comprising a nail, a cylindrical block of compressible material and a cap of sheet material having, in combination, means for driving the nail longitudinally through the block, means for transferring said assembled parts to a head forming die, said die, and means co-operating with said die to re-shape said block by compression whereby its thickness is decreased and to mold the cap on the block.

39. A machine for making insulated nails comprising a nail, a cylindrical block of compressible material and a cap of sheet material having, in combination, nail driving means, cap supplying means, block re-shaping means, and means for operating said parts to drive a nail longitudinally through the block, supply a cap to the block re-shaping means and simultaneously apply said cap to the block and compress said block into button-like form.

40. A machine for making insulated nails comprising a nail, and a cylindrical wood block having, in combination, means for inserting the nail through the block, a die, means for transferring said parts to the die, and means for compressing the block in the die into a button-like head constructed to produce a teat on the under side of said head.

41. A capping machine having, in combination, a tubular die, having a cutting edge at one end, means for feeding the material for the cap opposite said cutting edge, means for causing the die to dink a cap from the cap material, means for forcing the cap and material to be capped through the die from said cutting end, and means for closing the other end of the die to form a die cavity to receive the said materials.

42. A capping machine having, in combination, a tubular die having a flaring end formed with a cutting edge and a die cavity at its other end, means to actuate said die to dink a cap from cap material fed to the die and to close said die cavity, and means for forcing said cap and the material to be capped through the smaller portion of the die whereby to fold the cap about said material, and then into the closed die cavity.

43. A machine for making insulated nails comprising a nail, a block and a cap having, in combination, a block center punching station; a block nailing station; a capping station; means for simultaneously delivering a nail, a block and a cap severally to said stations, a block to the nailing station, and a previously nailed block to the capping station; and simultaneously operating center punching, nail driving and capping means at the respective stations.

44. A machine for making insulated nails comprising a nail, a block and a cap having, in combination, a block center punching station; a block nailing station; a capping station; a rotary turret having pockets for receiving the blocks; means for delivering blocks to said pockets; means for actuating said turret step by step through said stations; and means at said stations for successively center punching, nailing and capping said blocks.

45. A machine for making insulated nails comprising a nail, a block and a cap having, in combination, a rotary turret presenting a recess for receiving and transferring the block, means for rotating said turret step by step, means for successively driving the nail into said block and applying the cap during periods of rest of the turret, and means for supplying said turret with blocks.

46. A machine for making insulated nails comprising a nail, a block and a cap having, in combination, a rotary turret presenting a plurality of recesses for holding blocks, means for rotating the turret step by step and successively loading said recesses with blocks, and means actuated in timed relation to the turret movements for successively driving a nail into and then applying a cap to each block transferred by the turret.

47. A machine for making insulated nails comprising a nail, a block and a cap having, in combination, a rotary turret presenting a plurality of recesses for holding blocks, means for rotating the turret step by step and successively loading said recesses with blocks, and means actuated in timed relation to the turret movements for successively driving a nail into and then applying a cap to each block transferred by the turret, said last named means operating simultaneously on different blocks.

48. A machine for making insulated nails comprising a nail, a block and a cap having, in combination, a rotary turret presenting a plurality of recesses for holding blocks, means for rotating the turret step by step and successively loading said recesses with blocks, a capping die adjacent the turret with which said recesses successively become aligned, and means for simultaneously driving a nail into a block held in one recess and ejecting a previously nailed block held in another recess into said die and applying a cap thereto, said means operating during periods of rest of the turret movement.

49. A machine for making insulated nails comprising a nail, a block and a cap having, in combination, a rotary turret presenting a plurality of recesses for holding blocks, means for rotating said turret step by step, a block loading mechanism, a nailing mechanism, and a capping mechanism, spaced about said turret and located opposite different recesses when the turret is at rest, and means for operating all of said mechanism during each period of rest of the turret.

50. A machine for making insulated nails comprising a nail, a block and a cap having, in combination, a rotary turret having a plurality of pockets for holding the blocks, means for supplying a block to each pocket, means for rotating said turret step by step to transfer the blocks, means for successively center punching, nailing and capping each block during periods of rest of the turret, and means for supplying nails and caps in timed relation to the turret movements.

In testimony whereof I have signed my name to this specification.

CHARLES C. BLAKE.